(12) United States Patent
Suba et al.

(10) Patent No.: US 6,315,069 B1
(45) Date of Patent: Nov. 13, 2001

(54) POSITIONING STRUCTURE OF A BATTERY COOLING DUCT FOR A VEHICLE

(75) Inventors: Masahiko Suba, Kanagawa-ken (JP); Kazuaki Iwamoto, Novi, MI (US)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/513,221

(22) Filed: Feb. 25, 2000

(30) Foreign Application Priority Data

Feb. 26, 1999 (JP) .................................................. 11-049338

(51) Int. Cl.⁷ .................................................. B60R 16/04
(52) U.S. Cl. .......................................... 180/68.5; 429/120
(58) Field of Search ................................. 180/68.1, 68.2, 180/68.3, 68.5, 65.1; 429/120

(56) References Cited

U.S. PATENT DOCUMENTS

| 5,392,873 | * | 2/1995 | Masuyama et al. | 180/6.5 |
| 5,490,572 | * | 2/1996 | Tajiri et al. | 180/68.5 |
| 5,501,289 | * | 3/1996 | Nishikawa et al. | 180/68.5 |
| 5,534,364 | * | 7/1996 | Watanabe et al. | 180/68.5 |

FOREIGN PATENT DOCUMENTS

| 5-169981 | | 7/1993 | (JP) . |
| 747846 | * | 2/1995 | (JP) . |
| 7164893 | * | 6/1995 | (JP) . |
| 7304338 | * | 11/1995 | (JP) . |
| 840088 | * | 2/1996 | (JP) . |
| 9109692 | * | 4/1997 | (JP) . |
| 1022467 | * | 9/1998 | (JP) . |
| 10306722 | * | 11/1998 | (JP) . |

* cited by examiner

*Primary Examiner*—Brian L. Johnson
*Assistant Examiner*—Bryan Fischmann
(74) *Attorney, Agent, or Firm*—McDermott, Will & Emery

(57) ABSTRACT

A battery is disposed beneath a floor panel of a vehicle, and an intake duct for supplying air from within a passenger compartment extends in a longitudinal direction of the vehicle above one side of the floor panel, passing through the floor panel above the battery. An exhaust duct for exhausting air supplied to the battery extends in the longitudinal direction above the other side of the floor panel, passing through the floor panel above the battery. Air inside the passenger compartment is supplied to the battery via the intake duct so as to cool the battery. After cooling the battery, air of an elevated temperature is exhausted via the exhaust duct.

15 Claims, 4 Drawing Sheets

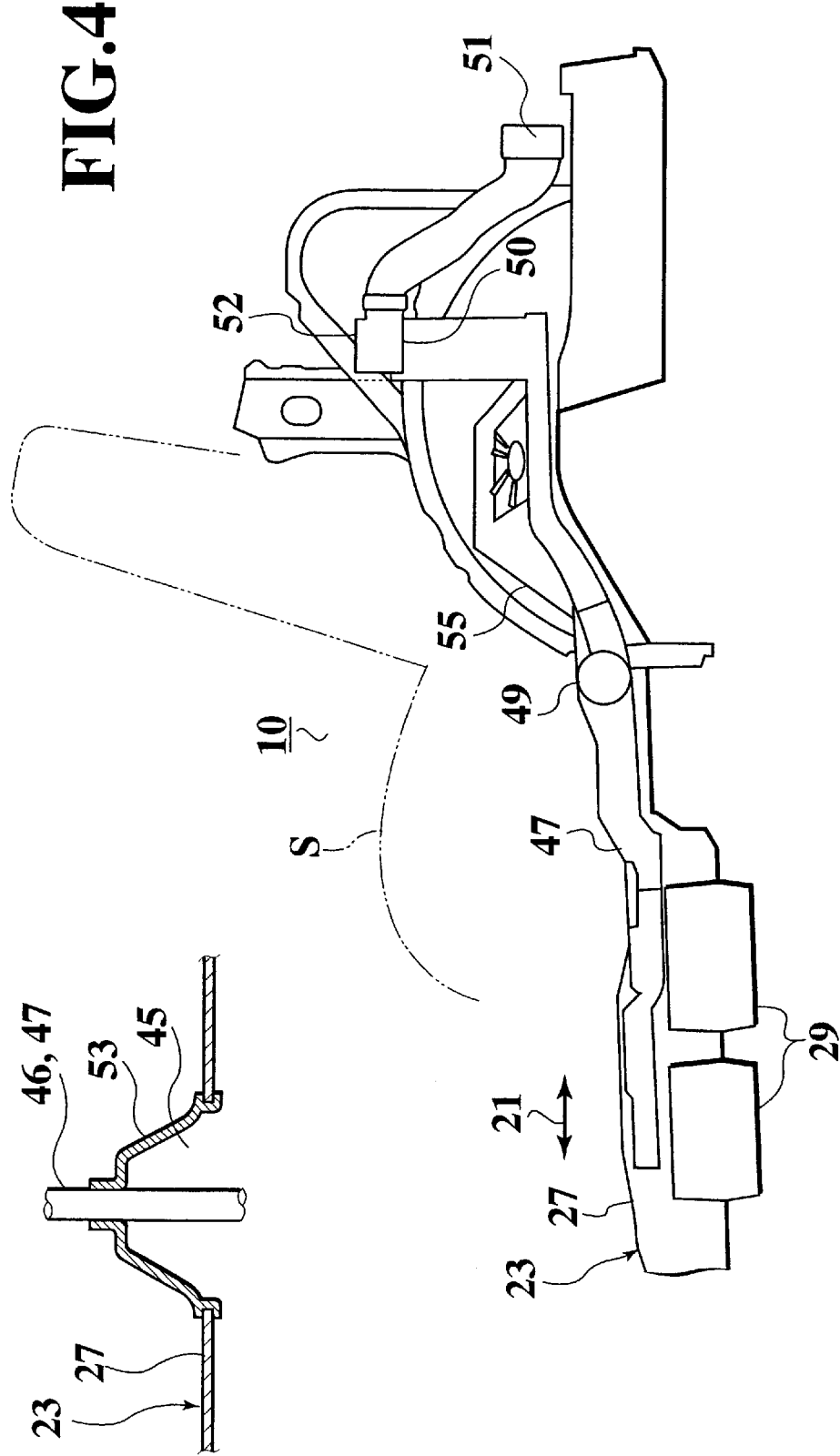
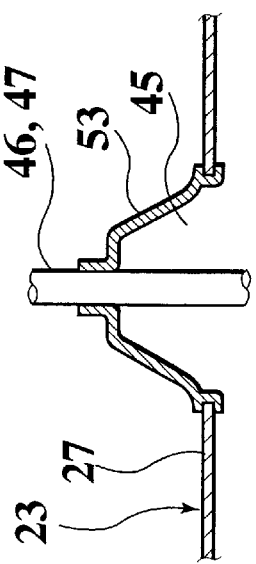

POSITIONING STRUCTURE OF A BATTERY COOLING DUCT FOR A VEHICLE

The content of application No. TOKUGANHEI 11-049338 which was filed in Japan on Feb. 26, 1999 and on which the claim to priority for this application is based, is hereby incorporated by reference to the extent permitted under United States code, Title 35, and the Code of Federal Regulations, Title 37.

BACKGROUND OF THE INVENTION

The present invention relates to a positioning structure for a battery cooling duct for a vehicle such as a hybrid vehicle or electrical vehicle. A related structure is disclosed in the Japanese Patent Application Laid-Open Publication H5-169981.

SUMMARY OF THE INVENTION

In the above-noted disclosed structure, however, a battery is cooled by air that is taken in from an intake port that opens at an end of a side member. For this reason, when the vehicle drives at a low speed in summer, high-temperature air is taken in, and there is a possibility that the battery is not cooled effectively. In addition, there is also a possibility that rain water is sucked into the air intake port when it rains.

Accordingly, it is an object of the present invention to provide a positioning structure for a cooling duct achieving stable cooling of a battery.

A positioning structure according to the present invention has a floor panel, a battery disposed beneath the floor panel, an intake duct, and an exhaust duct. The intake duct has a front end and a rear internal-air intake port. The intake duct extends above one side of the floor panel in a longitudinal direction of the vehicle and passes through the floor panel above the battery to connect the front end with the battery under the floor panel. The internal-air intake port opens toward a rear region of the compartment. The exhaust duct has a front end and a rear exhaust port. The exhaust duct extends in the longitudinal direction above the other side of the floor panel and passes through the floor panel above the battery to connect the front end with the battery under the floor panel.

BRIEF DESCRIPTION OF THE DRAWINGS

FIG. 4 is a side view of FIG. 2

FIG. 5 is a side cross-section view of a hole for passage of cooling air.

DESCRIPTION OF THE PREFERRED EMBODIMENTS

A preferred embodiment of the present invention is described below in detail, with references being made to relevant accompanying drawings.

Figure 1:
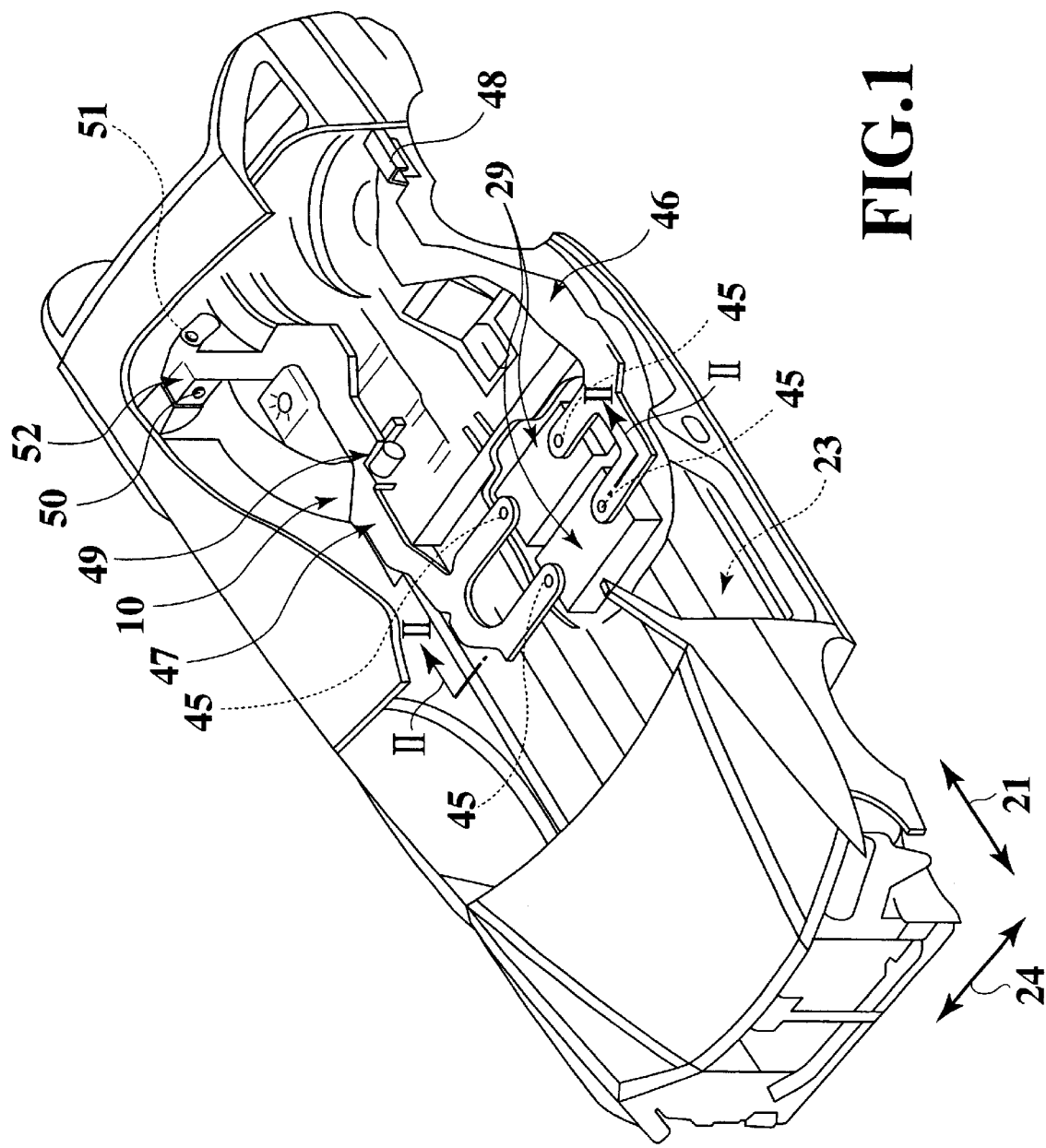
FIG. 1 is a partially cutaway perspective view of an embodiment of the present invention.
Figure 2:
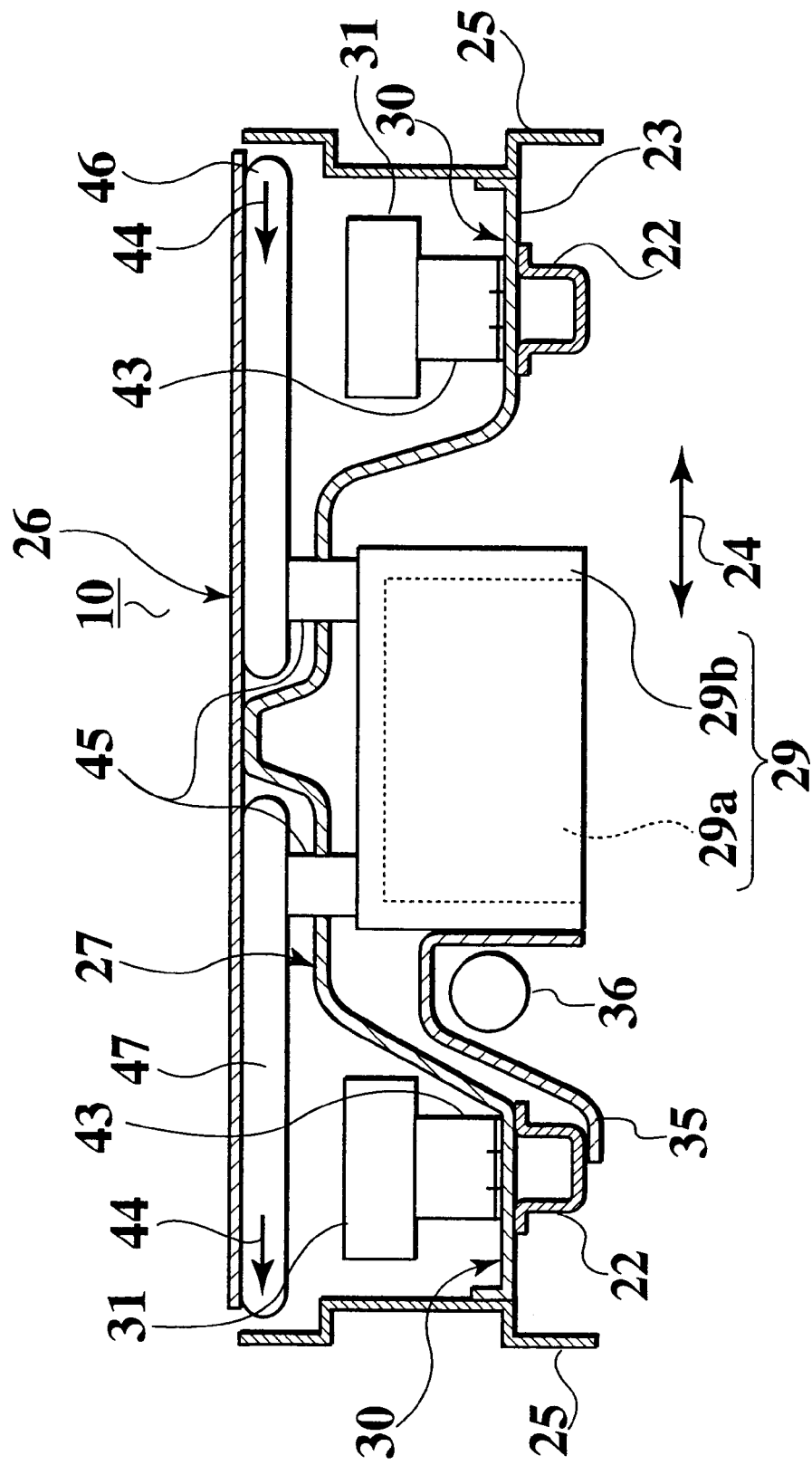
FIG. 2 is a cross-section view along the direction II—II indicated in FIG. 1.
Figure 3:
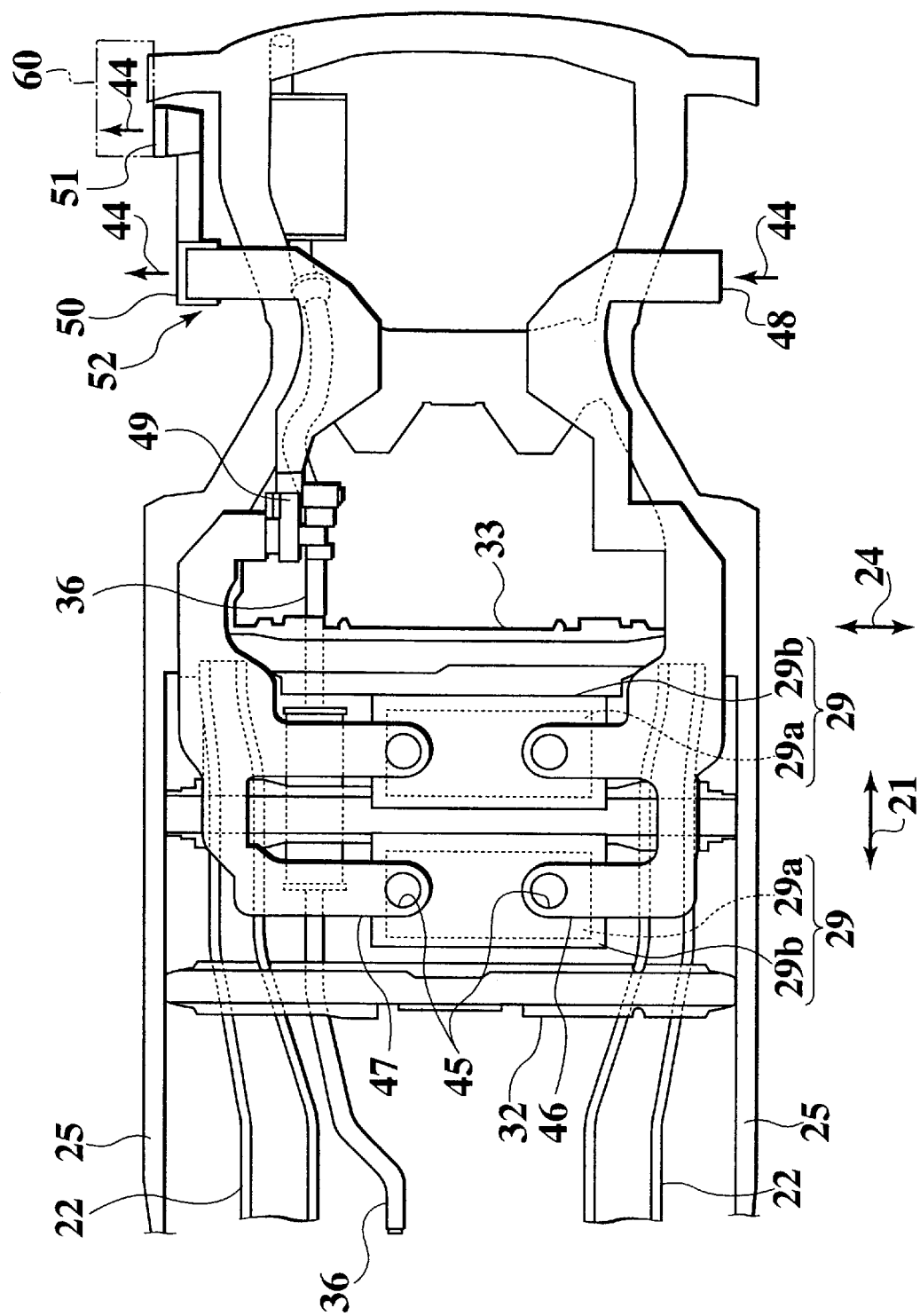
FIG. 3 is a plan view of FIG. 2.

FIG. 1 to FIG. 5 illustrate an embodiment of the present invention.

With regard to the configuration of the present invention, a floor panel 23 that defines the bottom of a passenger compartment 10 of the vehicle is mounted above a pair of side members 22 that extend along the longitudinal direction 21 of the vehicle. Side sill inner members 25 are mounted to each side of the floor panel 23 in the car width direction 24, and a carpet 26 is placed on the tope of the floor panel 23. For the purpose of this description, the floor panel is not shown in FIG. 3.

The floor panel and the side sill inner members 25 form a battery corresponding part which has a substantially W-shaped vertical cross-section along the width direction 24. The floor panel 23 at the battery corresponding part has a protrusion 27 at substantially the center in the width direction 24, and a depression 30 on both sides of the protrusion 27. A battery 29 is installed beneath the protrusion 27. The battery 29 has a battery body 29a and a case 29b into which the battery body 29a is housed. A space through which cooling air passes is formed between the battery body 29a and the case 29b.

Control units 31 are arranged on the upper surface of the depressions 30 of the floor panel 23 with intervening spacers 43 therebetween. The battery 29 is disposed between a center crossmember 32 in front of the rear seat S and a rear crossmember 33 below the rear seat S. An exhaust pipe 36 covered with a heat-insulating sheet 35 is disposed between the protrusion 27 and the battery 29.

An intake duct 46 for taking in passenger compartment air 44 has an internal-air intake port 48 at the rear end. The internal-air intake port 48 is disposed at one side wall of the passenger compartment 10 in rear of the rear seat S. The intake duct 46 extends forward from the internal-air intake port 48 substantially along the upper surface of the floor panel 23, passing nearby one side wall of the passenger compartment 10, passing through a cooling air passage hole 45 above the battery 29 to extend downward under the floor panel 23. The front end of the intake duct 46 is connected to the upper surface of the case 29b of the battery 29, and opens into the inside of the case 29b.

The internal-air intake port 48 is preferably installed near the side wall that is opposite the exhaust pipe 36.

The front end of the exhaust duct 47 is connected to the upper surface of the case 29b of the battery 29, and opens into the inside of the case 29b. The exhaust duct 47 passes through a different cooling air passage hole 45 to above the floor panel 23, and passes substantially along the upper surface of the floor panel 23, in proximity to the other side wall of the passenger compartment 10, extending rearward. An external exhaust port 51 of the exhaust duct 47 is connected to a drafter 60 for exhausting air from within the passenger compartment 10.

A cooling fan 49 is provided midway in the exhaust duct 47. This cooling fan 49 is disposed under the rear seat S and in proximity to a kickup part 55 of the floor panel 23.

The exhaust duct 47 additionally has an internal exhaust port 50 for the circulation of internal air, and a damper 52 for switching between the internal exhaust port 50 and the external exhaust port 51. The internal exhaust port 50 is disposed on the other side wall of the passenger compartment 10.

The operating action of this embodiment is as follows.

Internal air 44 that is taken from the internal-air intake port 48 on the one side wall of the passenger compartment 10 to the rear of the rear seat S is guided forward via the intake duct 46, and is supplied to the battery 29 under the floor panel 23 at substantially the center of the vehicle. Internal air 44 that has cooled the battery 29 is sucked in by the cooling fan 49 and guide rearward via the exhaust duct 47, after which it is exhausted to either the internal exhaust port 50 or the external exhaust port 51, depending upon the switching of the damper 52.

Since the battery 29 is cooled by the adjustable passenger compartment air 44, even if the outside air temperature is high, such as when the vehicle drives at low speed in summer, there is no danger of a decline in the efficiency of cooling the battery 29, as stable battery cooling efficiency is maintained. Additionally, since the battery 29 is cooled by air 44 from within the passenger compartment, there is no danger of taking in rain water when it is raining, as water-tightness is maintained.

Since the internal-air intake port is disposed on a side wall at the rear part of the vehicle, it is possible to make efficient use of air 44 from within the passenger compartment that is blown thereinto by an air conditioner via, for example, the instrument panel or below the instrument panel, and adjusted in temperature by the occupants of the vehicle. That is, there is no dedicated use of part of the air within the passenger compartment blown out of an air conditioner used immediately for just cooling the battery.

Since the internal exhaust port 50 is disposed at the other side wall at the rear of the passenger compartment 10, when internal air is circulated, there is no direct flow of hot air to an occupant of the vehicle or to the internal intake port of an air conditioner (not shown in the drawing, usually located within the instrument panel).

By disposing the external exhaust port 51 at the other side wall at the rear of the passenger compartment 10, it is possible to use an existing drafter 60 intended for exhausting air from within the passenger compartment 10.

Since the cooling fan 49 provided midway in the exhaust duct 47 is disposed below the rear seat S and particularly since the cooling fan 49 is disposed in proximity to the kickup part 55 of the floor panel 23, it is possible to make effective use of a space that occurs when the floor carpet surface and rear seat position rises by disposing the battery 29 below the floor panel 23. In addition, since sound from the fan is transmitted only downstream, by placing the cooling fan in the above-noted position, it is possible to maintain quiet within the passenger compartment.

Since the internal-air intake port 48 is disposed at the side wall that is on the opposite side from the exhaust pipe 36, there is no heating of the passenger compartment air 44 flowing in the intake duct by radiation from the exhaust pipe 36, thereby preventing a loss of cooling efficiency with respect to the battery 29.

Since the internal exhaust port 50 for internal air circulation is disposed on the other side wall, and since there is switching by the damper 52 between the drafter 60 and the internal exhaust port 50, it is possible to exhaust internal passenger compartment air 44 that has cooled the battery 49 either within the passenger compartment or to the outside.

What is claimed is:

1. A positioning structure of a battery cooling duct for a vehicle comprising:
   a floor panel defining a bottom of a passenger compartment;
   a battery under the floor panel;
   an intake duct with a front end and a rear internal-air intake port, the intake duct extending above one side of the floor panel in a longitudinal direction of the vehicle and passing through the floor panel above the battery to connect the front end with the battery under the floor panel, and the internal-air intake port opening toward a rear region of the compartment, and;
   an exhaust duct with a front end and a rear exhaust port, the exhaust duct extending in the longitudinal direction above the other side of the floor panel and passing through the floor panel above the battery to connect the front end with the battery under the floor panel.

2. A positioning structure according to claim 1, further comprising an exhaust fan disposed within the exhaust duct beneath a rear seat.

3. A positioning structure according to claim 1, further comprising an exhaust pipe disposed beneath the other side of the floor panel.

4. A positioning structure according to claim 1, wherein:
   the exhaust port of the exhaust duct comprises an external exhaust port opening to an outside of the passenger compartment.

5. A positioning structure according to claim 1, wherein:
   the exhaust port of the exhaust duct comprises an internal exhaust port opening to an inside of the passenger compartment.

6. A positioning structure according to claim 1, wherein:
   the exhaust port of the exhaust duct comprises an external exhaust port opening to an outside of the passenger compartment and an internal exhaust port opening to an inside of the passenger compartment, and
   wherein the exhaust duct comprises a damper switching between the external exhaust port and the internal exhaust port.

7. A positioning structure according to claim 1, wherein:
   the internal-air intake port of the intake duct is disposed rearward of a rear seat.

8. A positioning structure according to claim 5, wherein:
   the internal exhaust port of the exhaust duct is disposed rearward of the passenger compartment.

9. A positioning structure according to claim 4, further comprising:
   a drafter for exhausting air from within the passenger compartment, wherein
   the external exhaust port of the exhaust duct is connected to the drafter.

10. A positioning structure according to claim 1, wherein:
    the intake duct extends along an upper surface of the floor panel.

11. A positioning structure according to claim 1, wherein:
    the exhaust duct extends along an upper surface of the floor panel.

12. A positioning structure according to claim 1, wherein:
    the battery comprises a battery body and a case covering the battery, and wherein
    the front end of the intake duct is connected to the case and opens into inside thereof.

13. A positioning structure according to claim 1, wherein:
    the battery comprises a battery body and a case covering the battery, and wherein the front end of the exhaust duct is connected to the case and opens into inside thereof.

14. A vehicle comprising:
    a floor panel defining a bottom of a passenger compartment;
    a battery under the floor panel;
    an intake duct with a front end and a rear internal-air intake port, the intake duct extending above one side of the floor panel in a longitudinal direction of the vehicle and passing through the floor panel above the battery to connect the front end with the battery under the floor panel, and the internal-air intake port opening toward a rear region of the compartment, and;
    an exhaust duct with a front end and a rear exhaust port, the exhaust duct extending in the longitudinal direction above the other side of the floor panel and passing through the floor panel above the battery to connect the front end with the battery.

15. A battery cooling duct positioning structure for a vehicle comprising:

a floor panel;

a battery under the floor panel;

an intake duct for supplying air within a passenger compartment to the battery, extending above one side of the floor panel in a longitudinal direction of the vehicle and passing through the floor panel above the battery; and an exhaust duct for exhausting air supplied to the battery, extending above the other side of the floor panel in the longitudinal direction and passing through the floor panel above the battery.

* * * * *